(12) United States Patent
Lazaridis et al.

(10) Patent No.: US 7,103,333 B2
(45) Date of Patent: Sep. 5, 2006

(54) SYSTEM AND METHOD OF EXCHANGING IDENTIFICATION INFORMATION FOR MOBILE STATIONS

(75) Inventors: Mihal Lazaridis, Waterloo (CA); David P. Yach, Waterloo (CA); Gerhard D. Klassen, Waterloo (CA)

(73) Assignee: Research In Motion Limited, Waterloo (CA)

( * ) Notice: Subject to any disclaimer, the term of this patent is extended or adjusted under 35 U.S.C. 154(b) by 220 days.

(21) Appl. No.: 10/698,603

(22) Filed: Oct. 31, 2003

(65) Prior Publication Data

US 2004/0157590 A1 Aug. 12, 2004

Related U.S. Application Data

(60) Provisional application No. 60/440,363, filed on Jan. 16, 2003.

(51) Int. Cl.
*H04M 3/42* (2006.01)

(52) U.S. Cl. .............................. 455/212.1; 455/212.2; 455/415

(58) Field of Classification Search ................ 455/415, 455/412.1, 411, 450, 509, 412.2, 403, 424, 455/554.2, 428, 414.1, 450.1
See application file for complete search history.

(56) References Cited

U.S. PATENT DOCUMENTS

| 6,810,258 B1* | 10/2004 | Vialen ........................ 455/450 |
| 2002/0035594 A1 | 3/2002 | Dreke et al. |
| 2002/0107982 A1 | 8/2002 | Teodosiu et al. |

FOREIGN PATENT DOCUMENTS

| EP | 0 878 940 A2 | 11/1998 |
| GB | 2 367 205 A | 3/2002 |
| WO | WO 97/14234 A2 | 4/1997 |
| WO | WO 01/15387 A1 | 3/2001 |
| WO | WO 02/054745 A1 | 7/2002 |
| WO | WO 03/003678 A1 | 1/2003 |

* cited by examiner

*Primary Examiner*—CongVan Tran
(74) *Attorney, Agent, or Firm*—Jones Day; Krishna K. Pathiyal; Robert C. Liang

(57) ABSTRACT

A system is provided for allowing mobile stations to exchange identification information using a predetermined communication path for the purpose of obtaining identification information to use in establishing a different communication path for communicating.

115 Claims, 9 Drawing Sheets

SYSTEM AND METHOD OF EXCHANGING IDENTIFICATION INFORMATION FOR MOBILE STATIONS

CROSS-REFERENCE TO RELATED APPLICATIONS

This application claims the benefit of U.S. Provisional Application No. 60/440,363 entitled "System And Method Of Exchanging Identification Information For Mobile Stations," which was filed on Jan. 16, 2003. The entire disclosure of United States Provisional Application No. 60/440,363 is hereby incorporated into the present application by reference.

BACKGROUND

1. Field

The systems and methods described in this patent document relate generally to wireless communication and more specifically to identification information for mobile stations.

2. Description of the Related Art

Mobile stations, such as mobile telephones, mobile email devices, and other mobile communication devices, which communicate via a wireless network, typically function as client devices that request access to various services through the wireless network. These services may include telephone services, e-mail services, web access services and various messaging services. Wireless network operators require data from mobile stations to traverse gateways and central routing points, which are located outside of the wireless network, to maintain strict billing and usage models. The primary goal of those running the networks is to monitor data usage and charge appropriately, despite the fact that this may limit the options for the mobile stations on the network. Thus, wireless users may be restricted in what they can do and may be forced into a limited data communication model that inhibits expansion of usage models. This restrictive network design limits the average revenue per user and the growth of wireless networks for data traffic.

Systems for peer-to-peer communication are also available for mobile stations. Current peer-to-peer communication systems, such as SMS or instant messaging, use centralized gateways that attempt to keep track of all users and correlate them into requested groups or buddy lists. These systems force users to use centralized gateways for all communication, thus creating the potential for bottlenecks, data slowdowns and single points of failure.

SUMMARY

A system is provided for allowing mobile stations to exchange identification information using a predetermined communication path for the purpose of obtaining identification information to use in establishing a different communication path for communicating.

According to some of the claims, provided is a method in a first mobile station that comprises the following steps. In one step, the first mobile station exchanges network identification information with a second mobile station using a wireless network and a service gateway. In another step, the first mobile station stores a network identification code of the second mobile station. In a third step, the first mobile station requests that a wireless communication link be established between the first mobile station and the second mobile station via the wireless network using the network identification code wherein the communication link does not require any service gateway.

Also according to some of the claims, provided is a method in a wireless network that comprises the following steps. In one step, the wireless network provides a first network identification code to a first mobile station and a second network identification code to a second mobile station. In another step, the wireless network transfers messages between the first mobile station and the second mobile station via a service gateway wherein the messages comprise the first network identification code, the second network identification code, or both. In a third step, the wireless network provides a communication link between the first mobile station and the second mobile station in response to a request from either the first or second mobile stations or both that includes the first and second network identification codes wherein the communication link does not require any service gateway.

DETAILED DESCRIPTION

Figure 1:
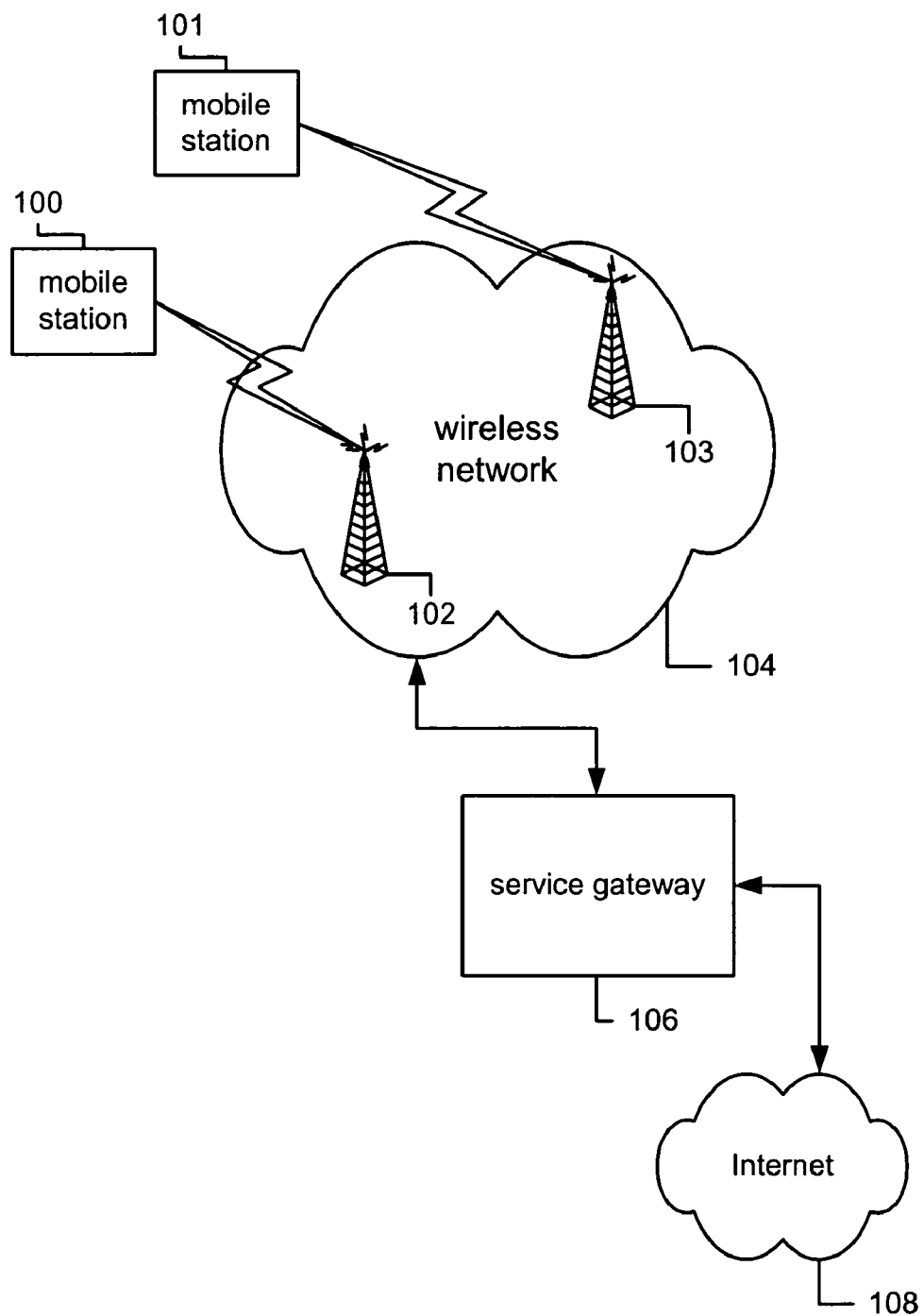
FIG. 1 is a block diagram of a wireless communication system.

FIG. 1 is a block diagram of an exemplary wireless communication system. The system comprises a first mobile station 100, a second mobile station 101, a wireless network 104, a first wireless network base station 102, a second wireless network base station 103, and a service gateway 106. The system is capable of connecting to various services such as the Internet 108 via the service gateway 106.

In the example shown, each mobile station 100, 101 communicates via the wireless network base stations 102, 103 and the wireless network 104, preferably using RF links which follow a radio protocol dictated by the equipment in the wireless network 104. Other wireless communication forms, however, may be used. The wireless network 104 preferably is a network such as GMS/GPRS, CDMA/W-CDMA, EDGE, UMTS, or other compatible network. Each mobile station 100, 101 executes a sequence of connection steps so that a connection can be established with one of the wireless network base stations 102, 103. During the connection process, an identification code such as an Internet Protocol (IP) address or some other code is assigned to the mobile station 100, 101. After receiving the identification code, the mobile station 100 or 101 is able to request services through the wireless network 104.

In this exemplary system, the service gateway 106 preferably is connected to the wireless network 104 through documented TCP/IP or UDP/IP access points. When a request for service from a mobile station 100, 101 is received by the service gateway 106, the service gateway 106 functions as a proxy and sends the request to the Internet 108. In other system configurations, the service gateway 106 may alternatively proxy requests to another wide-area network, a private network, a VPN, an intranet, or some other network arrangement. The connection from the device gateway 106 to the Internet 108 in this example is a network connection such as a high-speed private ISDN or frame relay link, but alternatively could be a low-speed public dial phone connection or some other type of connection.

In the exemplary wireless network 104, each mobile station 100, 101 which attaches to the wireless network 104 requests a network resource so that it can be addressed at a high layer, such as the IP layer. In the exemplary systems of FIG. 1, each mobile station 100, 101 is allocated a private, dynamic IP address each time it connects to the network. The IP address might change each time a new connection is made and the IP address resource is utilized. This IP address is maintained while the user is actively using it, but may be unallocated if an idle period of non-use of sufficient duration occurs. This allows the wireless network 104 to manage the IP address resources and reduce inefficient use of these resources. Since the network 104 is private, only mobile stations 100, 101 and service gateways 106, which are directly attached to the wireless network 104, are able to use the IP addresses assigned to each mobile station.

Figure 2:
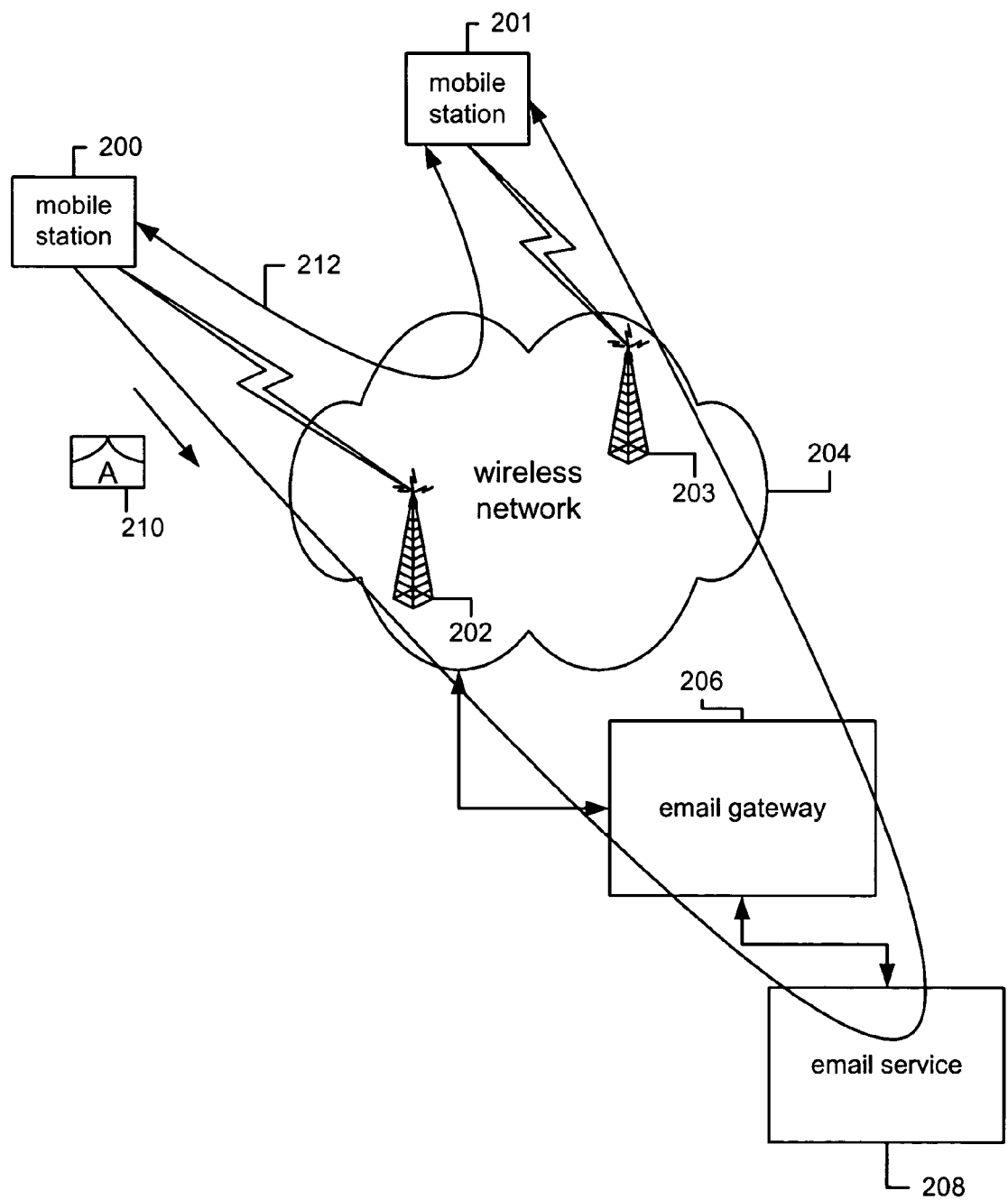
FIG. 2 is a block diagram of a system for exchanging mobile station identification information through an email service.

FIG. 2 is a block diagram of an exemplary system for exchanging mobile station identification information through an email service. The system comprises a first mobile station 200, a second mobile station 201, a wireless network 204, a first wireless network base station 202, and a second wireless network base station 203, which in this example correspond to similar elements described with respect to FIG. 1. The system further comprises an email gateway 206 for connecting with an email service 208.

The mobile stations 200, 201 exchange identification information using a predetermined communication path so that they can obtain the identification information to use in establishing a different and preferably better communication path. In this example, the first mobile station 200 sends its currently assigned IP address to the second mobile station 201 via an email message 210 which is addressed to the second mobile station 201. Preferably, an IP-Monitoring agent running in the first mobile station 200 automatically transmits the email message 210. The email message optionally could contain, in addition to the currently assigned IP address, status information regarding the user, location information regarding the user, and/or information relating to the capabilities of the mobile station such as device type and/or supported features and communication methods. The status information may include availability information that indicates how long the user is available or unavailable or some other relevant information. The location information may include the user's current base station location, country code and/or time zone.

The exemplary system operates in accordance with the following description. An IP-monitoring agent in the first mobile station 200 monitors and detects when the IP address of the first mobile station 200 changes, preferably, by monitoring memory in the first mobile station 200. When the IP-monitoring agent detects that the IP address has changed, it sends an e-mail message 210 to other mobile stations that are registered as associates of the user of the first mobile station 200. An associate could be a friend, an instant-messaging buddy, a person within a specified workgroup, or a co-worker of the user. The registration of associates may be recorded in a mapping table that preferably resides in the mobile station, but that also could reside in an external location. The mapping table indicates which mobile stations should be notified when the IP address of the first mobile station 200 changes. The mapping table preferably includes the email addresses of associates, which are used in the email message as the recipient addresses. Alternatively, the user of the first mobile station 200 may send the email message 210 manually. Also, the first mobile station 200 may send its IP address to the second mobile station 201 in an unrelated email message that was sent for another purpose. After a second mobile station receives the email message, it preferably sends a response to the first mobile station 201 that preferably confirms the second mobile station's reception of the email message and optionally provides updated information, such as status information and availability information regarding the second mobile station. The response may be in the form of a reply email message or in some other form.

The e-mail service 208 preferably is a publicly available service such as Hotmail, a service provided by an ISP such as AOL, or a corporate service such as a Microsoft Exchange server. The email gateway 206 is an example of a service gateway 106 (FIG. 1), which allows the mobile stations 200, 201 to send and receive email messages using the email service 208.

The mobile stations 200, 201 use the identification information such as IP addresses to establish a communication link 212 within the wireless network 204 that does not utilize resources outside of the wireless network 204. Because the communication link 212 between the mobile stations 200, 201 does not traverse a service gateway, using the communication link 212 should reduce latency and reduce overall network traffic. In addition, the communication link 212 can be used to exchange messages which are arbitrarily large, which is an improvement over the 160-character limit of current short message service (SMS) services.

The communication links 212 can act as the foundation for a collection of wireless network-only services that do not rely upon external gateways. These services include a range of peer-to-peer or client-server services. For example, an instant messaging conversation can take place between two or more peers in a collaborative group, or the first mobile station 200 could act as a web server and allow the second mobile station 201 to attach using HTTP protocols to provide web pages for information exchange. Other wireless network-only services are also possible.

The system described with respect to FIG. 2 allows mobile stations 200, 201 to be aware of and use IP addresses of other mobile stations which communicate via the wireless network 204 even when the IP addresses of the mobile stations change. IP addresses for mobile stations can change when the wireless network 204 uses a dynamic IP address mechanism such as DHCP.

Figure 3:
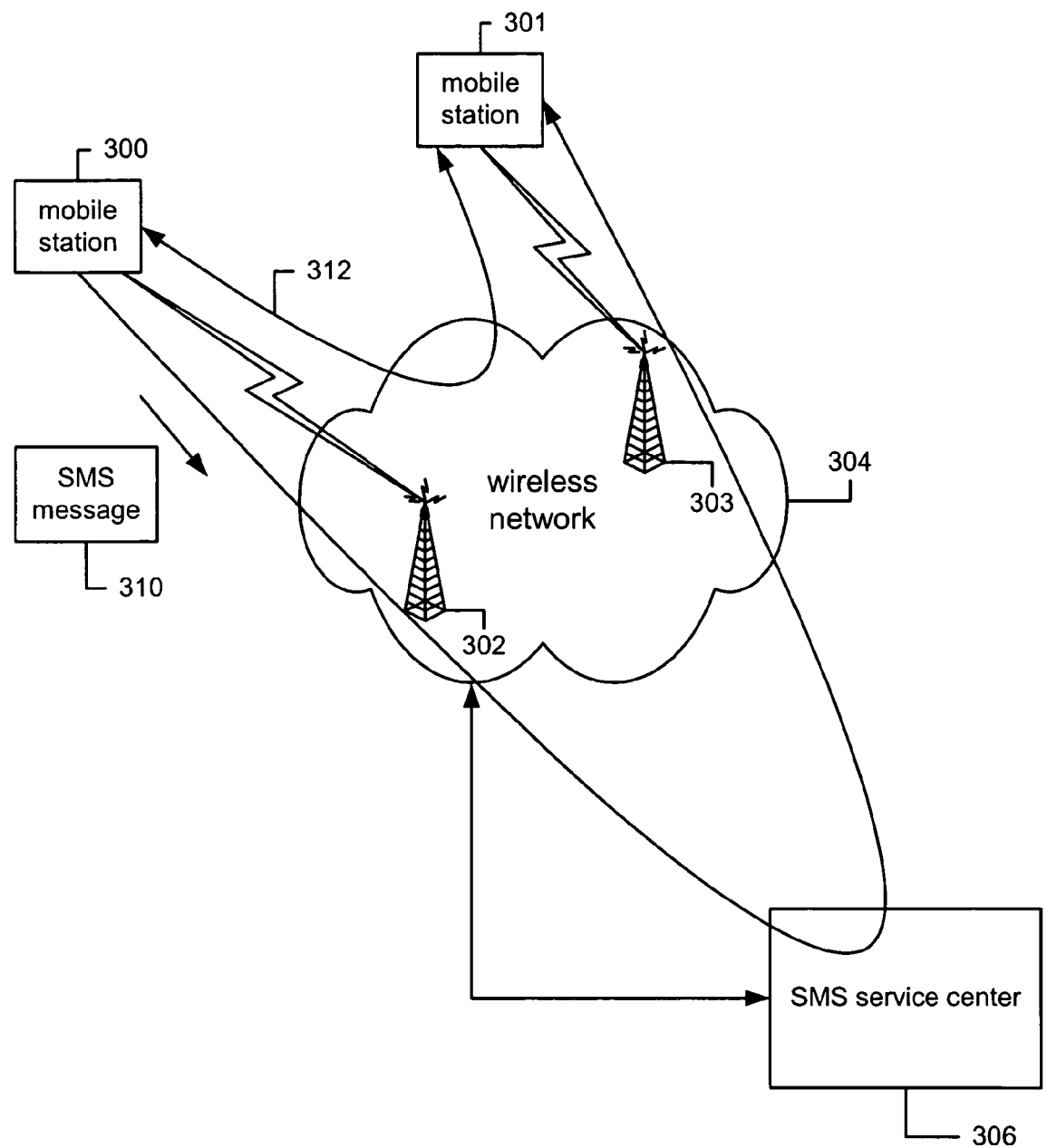
FIG. 3 is a block diagram of a system for exchanging mobile station identification information through an SMS service.

FIG. 3 is a block diagram of a system for exchanging mobile station identification information through an SMS service. The system comprises a first mobile station 300, a second mobile station 301, and a wireless network 304 that further comprises a first wireless network base station 302 and a second wireless network base station 303. The system further comprises an SMS service center 306.

The wireless network 304 provides the mobile stations 300, 301 with support for a short messaging service (SMS).

The service provider for this service is the SMS service center 306 (SMSC), which acts as the service gateway which supports the routing of messages between mobile stations 300 and 301. The SMSC 306 may also support routing of messages to and from senders which are not connected to the wireless network 304.

In this example, the current IP address of the first mobile station 300 is sent in an SMS message 310 which is addressed to the second mobile station 301. The SMS message 310 preferably is sent automatically by an IP-Monitoring agent running within the first mobile station 300. Alternatively, the SMS message 310 may be sent manually by the user of the first mobile station 300 or the IP address may be sent to the second mobile station 301 in a message that was sent for another purpose.

Once the second mobile station 301 has received an SMS message 310 containing identification information for the first mobile station 300, the current IP address associated with the first mobile station 300 is known to the second mobile station 301, which can send data to the first mobile station 300. Also, after the second mobile station 301 provides its identification information to the first mobile station 300, the current IP address associated with the second mobile station 301 is known to the first mobile station 300, which can send data to the second station 301. The two mobile stations 300, 301 are thus able to communicate directly using a communication link 312 that only uses wireless network 304 resources. This communication link 312 can reduce latency, reduce overall network traffic and allow for larger messages to be exchanged beyond the 160-character limit of SMS. After an SMS message 310 is sent that contains identification information, the receiving mobile station preferably sends a response that confirms the reception and returns any updated information such as status information and availability information regarding the receiving mobile station.

Figure 4:
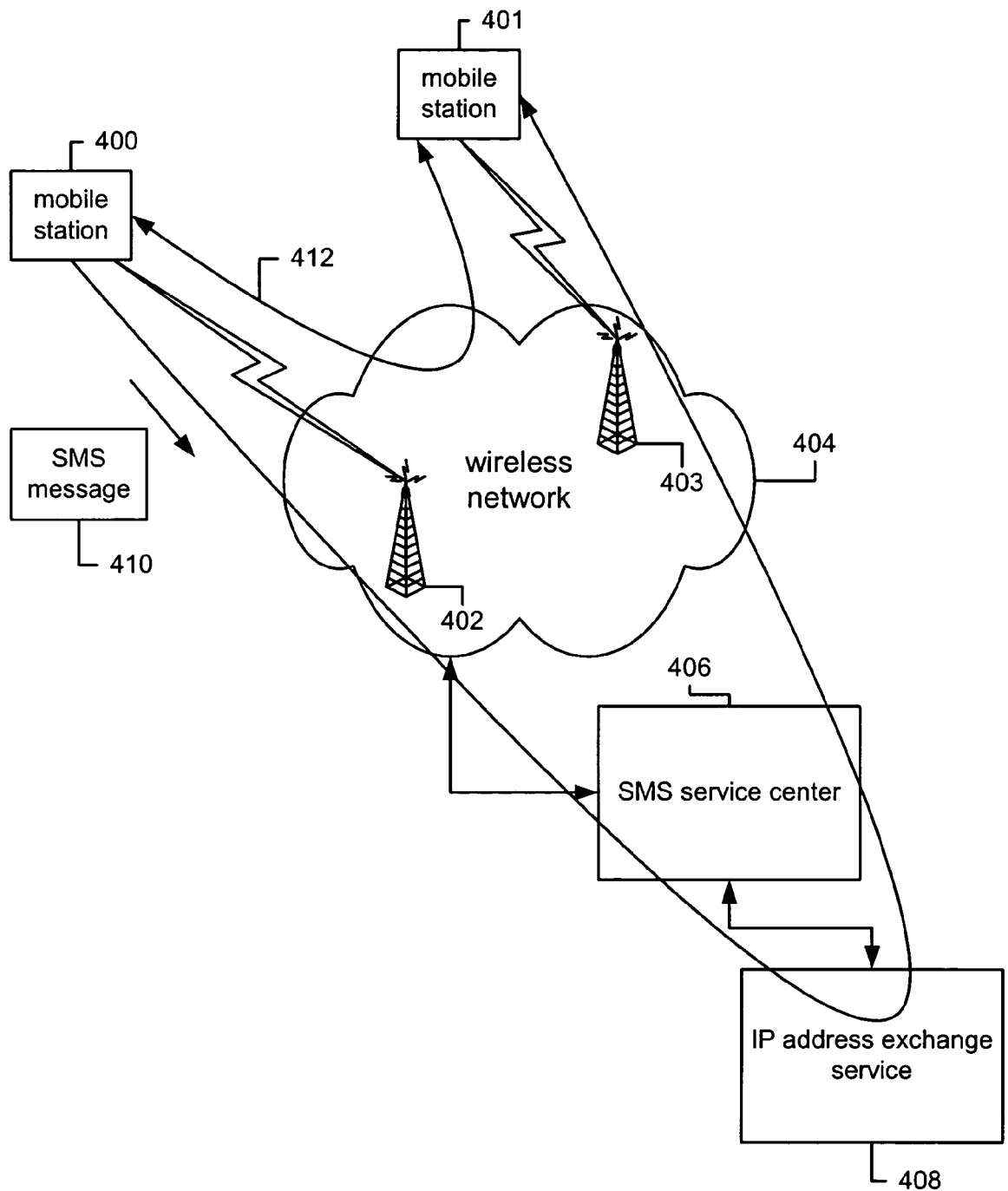
FIG. 4 is a block diagram of a system for exchanging mobile station identification information through an SMS service and an IP address exchange service.

FIG. 4 is a block diagram of a system for exchanging mobile station identification information through an SMS service and an IP address exchange service. The system comprises a first mobile station 400, a second mobile station 401 and a wireless network 404, which further comprises a first wireless network base station 402 and a second wireless network base station 403. The system further comprises an SMS service center 406 and an IP address exchange service 408.

The mobile stations 400, 401 can exchange IP addresses using SMS messages 410 and can establish a communication link 412 that only uses the resources of the wireless network 404 in a manner consistent with the system described with reference to FIG. 3. The IP address exchange service 408 in this example also processes the SMS messages 410 to provide additional services for the mobile stations 400, 401. The IP address exchange service 408 is capable of keeping track of and publishing identification information for mobile stations 400, 401, as well as location and presence information, for other mobile stations.

Figure 5:
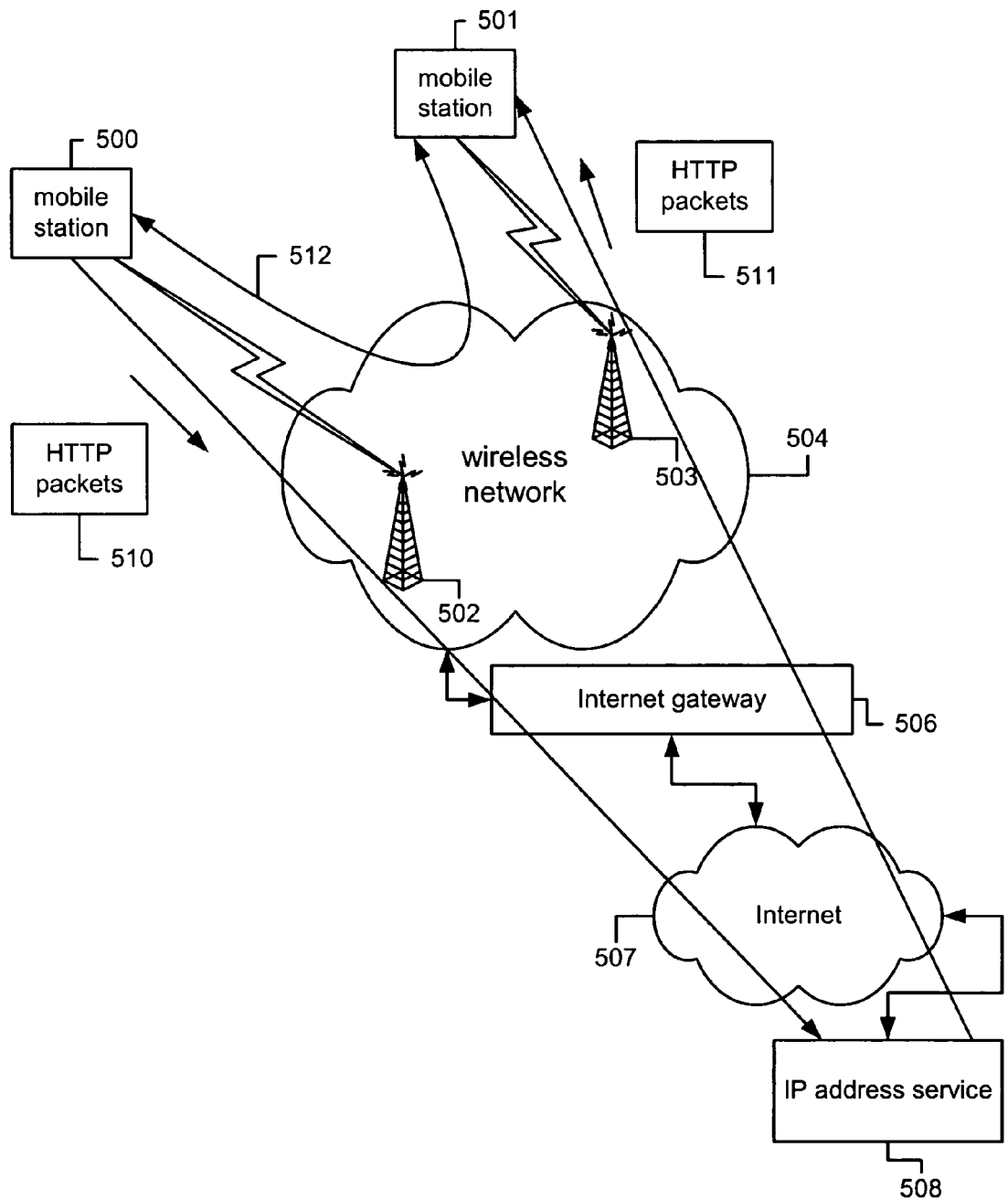
FIG. 5 is a block diagram of a system for exchanging mobile station identification information through an IP address service.

FIG. 5 is a block diagram of a system for exchanging mobile station identification information through an IP address service. The system comprises a first mobile station 500, a second mobile station 501, and a wireless network 504 that further comprises a first wireless network base station 502 and a second wireless network base station 503. The system further comprises an Internet gateway 506 for providing a connection to the Internet 507 and an IP address service 508 that is accessible via the Internet. The Internet gateway 506 preferably provides TCP/IP proxy agents that allow the mobile stations 500, 501 to access a wide range of services offered by sites on the Internet 507, including the IP address service 508. In this example, the HTTP protocol is used to exchange identification information between the mobile stations 500, 501, via the IP address service 508, in order to establish a communication link 512.

The IP address service 508 preferably is a web service that is hosted by a web server. Alternatively, the IP address service 508 may be a web application hosted by a web server or by an application server. In a preferred mode of operation, the first mobile station 500 uploads HTTP packets 510 that contain the IP address associated with the first mobile station 500 to the IP address service 508. The second mobile station 501 then uses the HTTP protocol to download HTTP packets 511 that contain the IP address associated with the first mobile station 500. Similarly, the second mobile station 501 uploads HTTP packets 510 that contain the IP address associated with the second mobile station 501 to the IP address service 508. The first mobile station 500 then uses the HTTP protocol to download HTTP packets 511 that contain the IP address associated with the second mobile station 501. Each mobile station 500, 501 can then use the IP addresses obtained as described above to establish and communicate directly over a communication link 512 which uses only the resources of the wireless network 504.

To receive identification information for other mobile stations, preferably the mobile stations 500, 501 periodically poll the IP address service 508 to determine whether IP addresses for other mobile stations have changed. Alternatively, the IP address service 508 may notify the mobile stations 500, 501 when an IP address has changed. The notification preferably occurs directly over the wireless network 504. Alternatively, the notification may use another service such as an email message, an SMS message, or a circuit-switched telephone call.

In another exemplary system, a mobile station can use a plurality of different services to obtain identification information. In this example, the mobile station may use the email service when exchanging identification information with a second mobile station, use a SMS service when exchanging information with a third mobile station, use an IP address exchange service to exchange identification information with a fourth mobile station, or use an IP address service to exchange identification or information with a fifth mobile station. Also, it is possible that one or more of these data exchange systems does not work. Therefore, as the mobile station 200, 300, 400, 500 tries each system and gets a failure, or in the absence of a return acknowledgment, it would use other systems and continue sending the updated IP address information message. For example, if the message is sent using the SMS system and no acknowledgment is received after a pre-determined period of time, the message is sent using the email system. If the email acknowledgment message is not received after the pre-determined period of time, the method is sent using the HTTP system. The system ensures that each correspondent is updated with the current IP address and that each message sent receives an acknowledgment.

Figure 6:
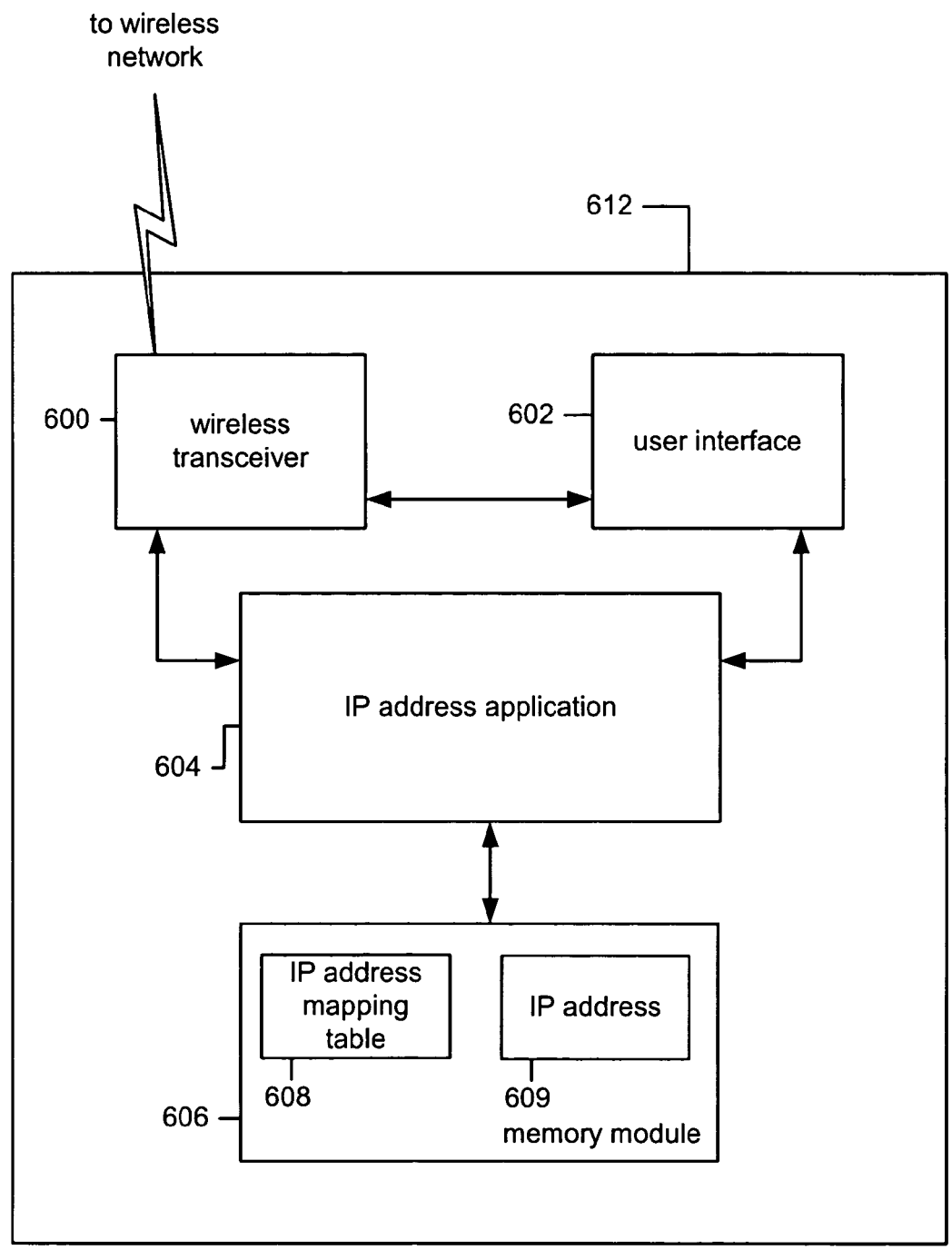
FIG. 6 is a block diagram of a mobile station.

FIG. 6 is a block diagram of an exemplary mobile station 612. The exemplary mobile station 612 comprises a wireless transceiver 600 for communicating with a wireless network, a user interface 602 for communicating with a user and a memory module 606 for storing and retrieving information such as an IP address mapping table 608 and an IP address 609. The mobile station 612 further comprises an IP address application 604.

The IP address application 604 monitors the IP address 609 that is stored in the memory module 606 of the mobile station. The IP address 609 is specific to the mobile station and is assigned by the wireless network. Preferably, when the IP address 609 changes, the IP address application 604 sends a message to the mobile stations listed in the IP address mapping table 608. The message contains the newly updated IP address 609, and can be sent using one of the earlier described systems. The addresses for the recipients of the message are preferably retrieved from an address book stored on the mobile station. Alternatively, the recipient address information may be retrieved from the IP address mapping table 608 or the recipient address information may be manually entered by the user of the mobile station 500.

The exemplary IP address mapping table 608 contains identification information for mobile stations with which the user of the mobile station wishes to communicate. For each such mobile station, the identification information preferably includes the name of the user the mobile station, the current IP address of the mobile station, and the previous IP address of the mobile station.

The current IP address of a mobile station is updated in the IP address mapping table 608 when an identification message is received that specifies a new IP address. In this example, the message is transmitted through the wireless network and received by the wireless transceiver 600. The message is displayed on a display screen included in the user interface 602 by a message application (not shown). The message application displays a listing of events to the user via the user interface 602. The listing is preferably sorted chronologically and may include incoming and outgoing email messages, incoming and outgoing telephone calls, incoming and outgoing SMS messages, task reminders, and/or IP address update messages. The IP address update message preferably contains a unique string in a subject field of the message that indicates the type of the message. Alternatively, the IP address update message may contain a unique string or binary-encoded element elsewhere in the message that indicates the type of the message. Preferably, the new IP information and base station location is hidden from the user. There are typically fields within email messages and within SMS messages that can be used for this purpose. For example, within an SMS message a user data header field that is not normally displayed to a user can be used.

Once the identification message is processed by the mobile station 612, the user of the mobile station 612 can later decide to use the identification information (e.g. IP information) to initiate a peer-to-peer conversation. Since the user is in a group list or preferred correspondents list, the initiator simply needs to send a first invitation to chat message. This first invitation message acts as both a request and an introduction as to why a conversation is desired. The recipient of the invitation message might then either have their device set to quiet or busy mode so that the invitation is automatically rejected with a busy indication returned as a reason for a rejection of the invitation. Alternatively, the recipient might read the message and decide that it cannot deal with the issue at that moment and reject the message or the user might accept the message and send back a chat acceptance indication as a response. After a chat acceptance indication is returned, a communication session can begin.

In this example, when the IP address application 604 detects that an IP address update message has been received by the mobile station, the IP address application 604 extracts the IP address from the IP address update message and updates the corresponding information in the IP address mapping table 608. The previous IP address for the mobile station that sent the IP address update message is preferably retained in the IP address mapping table 608. The previous IP address can be retained to allow returned messages addressed to the new address to be resent to the old address in case the updating of the IP address should not have occurred.

Preferably, messages sent using the exemplary system described herein are encrypted by the sending mobile station, so that when a message is sent to an unintended recipient mobile station, the recipient mobile station cannot read the message. Known public or private key encryption systems exist that can be used so that only the intended recipient mobile station can decrypt the message. A message may be sent to an unintended recipient mobile station, for example, when the IP address for an intended recipient mobile station stored in the IP address mapping table 608 has been reassigned to a different mobile station, and the new IP address for the intended recipient mobile station has not yet been received by the sending mobile station.

Figure 7:
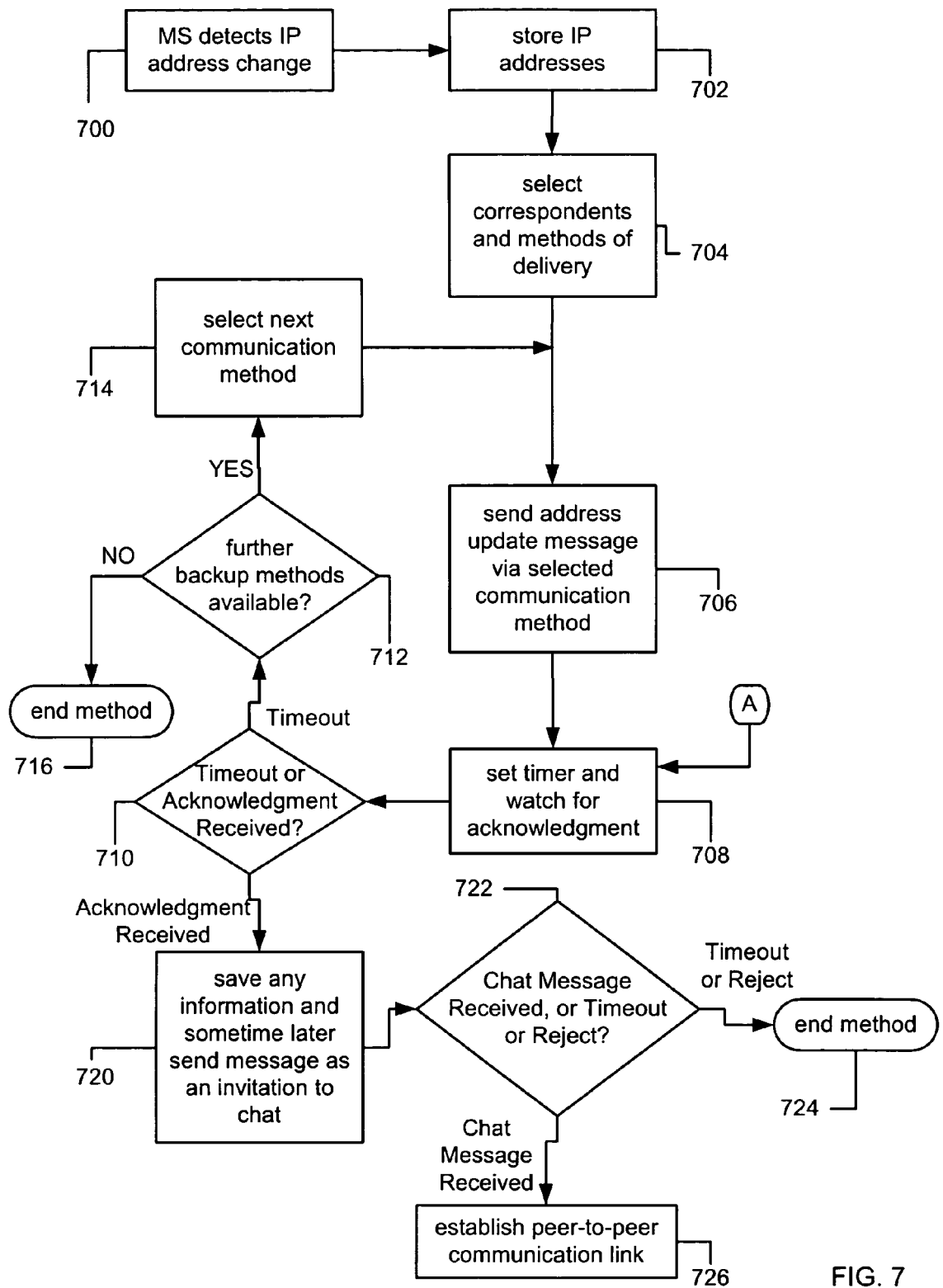
FIG. 7 is a flowchart of a method for exchanging mobile station identification information.

FIG. 7 is a flowchart that illustrates an exemplary process for use by a primary mobile station for exchanging mobile station identification information with correspondent mobile stations. This process illustrates how two mobile station can exchange identification codes such as IP addresses so that a communication link can be established between the two mobile stations over the wireless network using the IP addresses.

The process begins at step 700, where a mobile station (MS) detects that it has been assigned a new address by the wireless network. This detection could occur through the use of radio interface code in the MS since, preferably, radio interface code is used to re-negotiate network parameters for resource allocation. The new address is passed through the MS to the application layer where a module such as the IP address application 604 detects the new address. This address could be an IPv4 address, an IPv6 address or some other network address used by a wireless network. At step 702, the new address is stored so that future changes can be easily detected. After the address is stored at step 704, the MS preferably through the software locates the affected correspondents and determines the method it will use to send an IP address update message to the affected correspondents. After identifying the delivery method, the primary MS, at step 706, transmits the new mobile station IP address to the correspondent mobile stations in the IP address update message. The IP address update message is transmitted via a wireless network and a service gateway preferably as an email message, an SMS message, or using the HTTP protocol.

Figure 8:
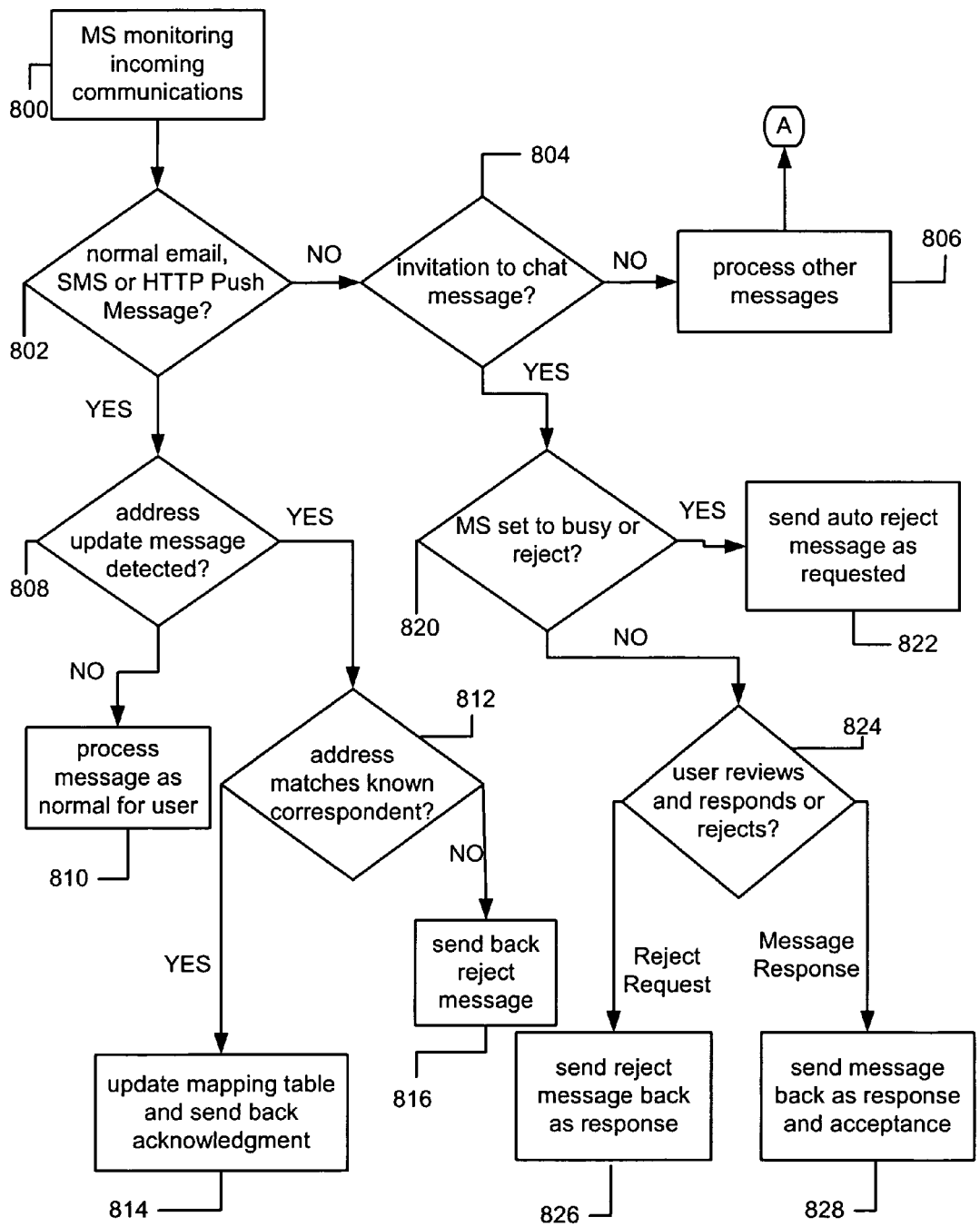
FIG. 8 is a flowchart of a method for receiving and accepting identification information from a mobile station.

After transmitting IP update messages, the primary MS, at step 708, sets a timer and waits for the reception of an acknowledgment message. An exemplary method for sending acknowledgments (A) is illustrated in FIG. 8. If an acknowledgment message is not received before the timer expires, preferably the MS will attempt to transmit the IP address update message using another method. If no other methods for transmitting the update message is available, the process ends at step 716. But, if there are other available methods for sending an update message, then another method is selected at step 714. After the next method is selected, the IP address update message is sent using this next method. At step 708, the timer is set again and the MS waits for an acknowledgment.

Alternatively, instead of proceeding to step 712, the MS could try re-transmitting the IP update message using the same transmission method. The MS could attempt to re-send the update message a number of times before abandoning on that transmission method. After abandoning on that transmission method, the MS could proceed to step 712.

As a further alternative, two or more methods of sending the address update message could be attempted simultaneously. The first successful message would be acknowledged, thus reducing latency by assuring that the fastest of multiple methods is used.

When an acknowledgment is received from a correspondent MS, the primary MS saves any information received in the acknowledgment message at step 720.

When a peer-to-peer conversation is desired, either the primary MS or a correspondent MS can initiate a direct peer-to-peer connection (presuming both the primary and correspondent mobile stations have provided current identification codes to the other). A user at the primary MS, for example, can compose a peer-to-peer message and send it without having to send an explicit invitation or wait for presence information. The MS then waits for a response, a timeout or a rejection from the correspondent (step 722). If no response is received in a predetermined time period or if the correspondent sends a reject message back, the connection is terminated and the peer-to-peer conversation is abandoned 724. For example, the correspondent might see the message and send back an "I am currently busy" indication to tell the sender that a peer-to-peer conversation is currently not possible. However, if the correspondent sends a response message back, it is assumed that a peer-to-peer conversation is open and a full peer-to-peer communication link is opened (step 726).

FIG. 8 is a flowchart that illustrates a process for receiving and accepting identification information from a mobile station. The process starts at step 800 where the MS monitors incoming communications. When an incoming message is received, the MS first determines if the incoming message is an incoming email, SMS or HTTP-based message (step 802). In most wireless networks it is now possible for Wireless Access Protocol (WAP) gateways to push HTTP messages to mobile stations. If the incoming message is not one of those types, the MS determines if the incoming message is a peer-to-peer message from a correspondent that has not established a full peer-to-peer communications link such as an invitation to chat message (step 804). If the incoming message is not that type of message, the incoming message is processed in accordance with procedures designed for other types of messages (step 806). For example, the incoming message could be a peer-to-peer communication with an existing correspondent or an acknowledgment message from an address update message (A).

If the incoming message is an email, SMS or HTTP message then the MS determines if the incoming message is an address update message at step 808. Preferably, the MS makes this determination by examining a particular field of the message and identifying a unique identifier, tag, string or some other predetermined pattern. If the MS determines that the incoming message is not an address update message, then the message is processed as normal (step 810). If the MS determines that the incoming message is an address update message, the MS then determines whether the incoming message is from a known correspondent at step 812.

The MS is preferably configured such that a user can designate certain correspondent addresses as preferred or non-preferred. The MS can use the designations when determining how to respond to message. For example, if an address update request is received from a non-preferred correspondent, the MS may automatically reject the message or prompt the user to accept or reject the message. This check provides for some level of privacy and ensures that each person involved in peer-to-peer communications has agreed to such communications. If a person requesting a peer-to-peer communication is unknown or is not considered a preferred peer-to-peer correspondent, a message can be returned that communicates that the address update message was rejected. If the message is accepted, the correspondent's entry in the address book database or RAM-based file is updated with the new IP address. This mapping table provides the basis for setting up and accepting peer-to-peer communications. The mapping table for each mobile station can therefore be specific for a user and only contain identification addresses for correspondents chosen by the user.

If the message was not a normal email, SMS or HTTP message but was an invitation to chat message, the MS determines if it has been set by the user to a busy or reject mode such as quiet mode (step 820). An invitation is regarded as a message from a preferred correspondent that currently does not have a fully established peer-to-peer communication pending. Quiet mode is typically a do-not-disturb mode or busy mode where all chat requests are rejected. If the mobile station has been set to automatically reject chat requests, a message is immediately sent back with the appropriate code (step 822). If a peer-to-peer message is received from a correspondent that is not preferred, the user will have the option of accepting or rejecting the communication, or alternatively, the message may be automatically rejected. Otherwise, the user is informed of the incoming chat request and can reject or accept the invitation to chat (step 824). If the user rejects the invitation, the user may optionally provide a reason, and the rejection message is transmitted to the originator of the request 826. Otherwise, the user can enter a response message that functions as an acceptance of the peer-to-peer communication request (step 828).

Once established, the communication link routes peer-to-peer messages between the mobile stations, preferably using only the resources of the wireless network without using external service gateways. When messages to and from the mobile stations do not traverse service gateways, overall network traffic can be reduced and the delivery time of the messages can be reduced. Also, size restrictions are not imposed on the messages by services or gateways since they are not used.

An example usage of the communication link is a chat session where messages are exchanged in real time between the users of the mobile stations, as described above. Many other usages for the communication link are possible. A method of exchanging mobile station identification information may include additional or fewer steps than those illustrated in FIGS. 7 and 8.

Figure 9:
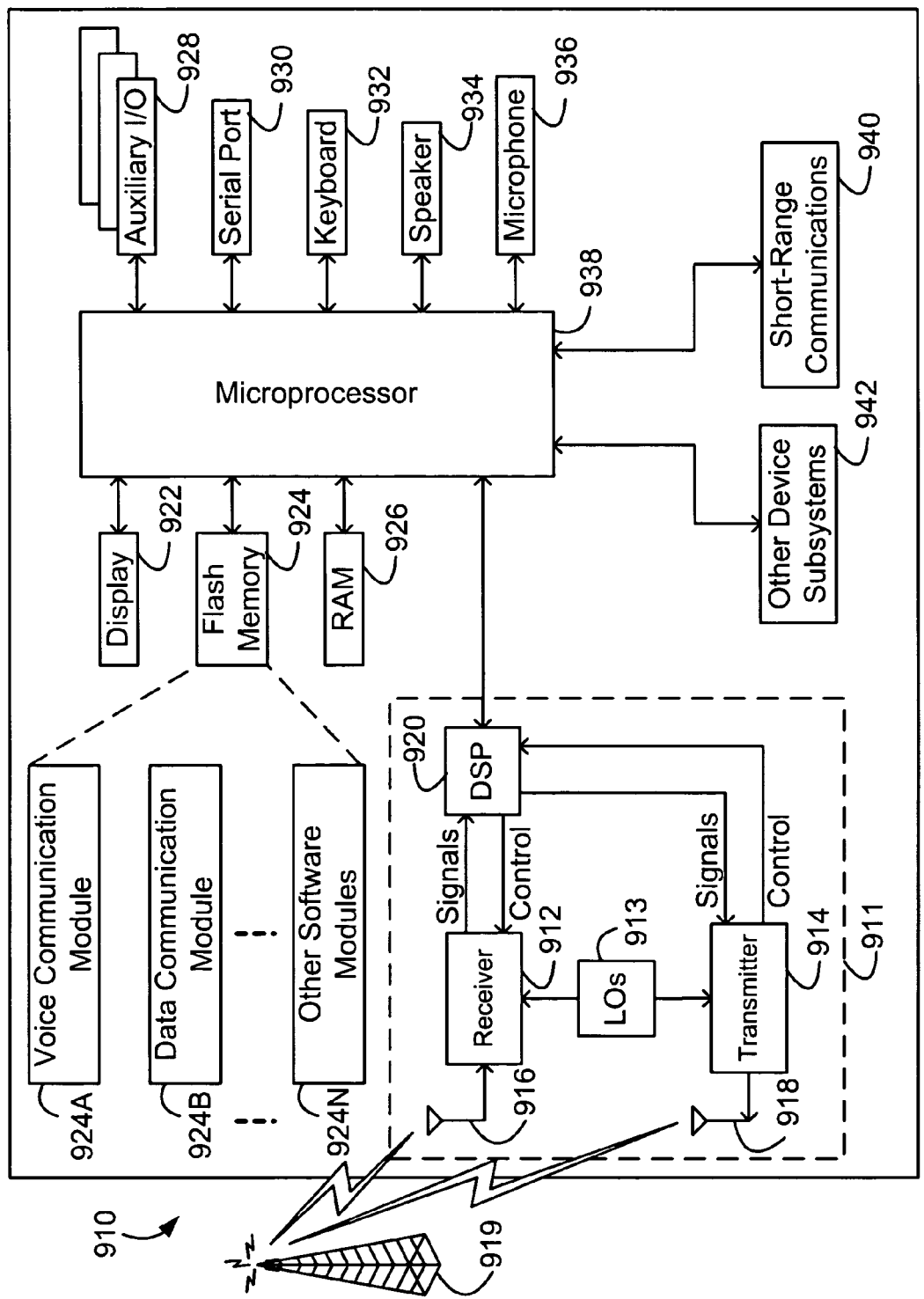
FIG. 9 is a block diagram of a dual-mode mobile communication device.

Shown in FIG. 9 is a block diagram of an exemplary dual-mode mobile communication device. The dual-mode communication device is another example of a possible mobile station.

The exemplary dual-mode mobile communication device 910 includes a transceiver 911, a microprocessor 938, a display 922, Flash memory 924, RAM memory 926, auxiliary input/output (I/O) devices 928, a serial port 930, a keyboard 932, a speaker 934, a microphone 936, a short-range wireless communications sub-system 940, and may also include other device sub-systems 942. The transceiver 911 preferably includes transmit and receive antennas 916, 918, a receiver 912, a transmitter 914, one or more local oscillators 913, and a digital signal processor 920. Within the Flash memory 924, the dual-mode mobile communication device 910 preferably includes a plurality of software modules 924A–924N that can be executed by the microprocessor 938 (and/or the DSP 920), including a voice communication module 924A, a data communication module 924B, and a plurality of other operational modules 924N for carrying out a plurality of other functions.

The dual-mode mobile communication device 910 is preferably a two-way communication device having voice and data communication capabilities. Thus, for example, the dual-mode mobile communication device 910 may communicate over a voice network, such as any of the analog or digital cellular networks, and may also communicate over a data network. The voice and data networks are depicted in FIG. 9 by the communication tower 919. These voice and data networks may be separate communication networks using separate infrastructure, such as base stations, network controllers, etc., or they may be integrated into a single wireless network.

The communication subsystem 911 is used to communicate with the voice and data network 919, and includes the receiver 912, the transmitter 914, the one or more local oscillators 913 and may also include the DSP 920. The DSP 920 is used to send and receive signals to and from the transmitter 914 and receiver 912, and is also utilized to receive control information from the transmitter 914 and to provide control information to the receiver 912. If the voice and data communications occur at a single frequency, or closely-spaced set of frequencies, then a single local oscillator 913 may be used in conjunction with the transmitter 914 and receiver 912. Alternatively, if different frequencies are utilized for voice communications versus data communications, then a plurality of local oscillators 913 can be used to generate a plurality of frequencies corresponding to the voice and data networks 919. Although two antennas 916, 918 are depicted in FIG. 9, the dual-mode mobile communication device 910 could be used with a single antenna structure. Information, which includes both voice and data information, is communicated to and from the communication module 911 via a link between the DSP 920 and the microprocessor 938. The detailed design of the communication subsystem 911, such as frequency band, component selection, power level, etc., is dependent upon the communication network 919 in which the dual-mode mobile communication device 910 is intended to operate. For example, a dual-mode mobile communication device 910 intended to operate in a North American market may include a communication subsystem 911 designed to operate with the Mobitex™ or DataTAC™ Mobile data communication networks and also designed to operate with any of a variety of voice communication networks, such as AMPS, TDMA, CDMA, PCS, etc., whereas a device 910 intended for use in Europe may be configured to operate with the General Packet Radio Service (GPRS) data communication network and the GSM voice communication network. Other types of data and voice networks, both separate and integrated, may also be utilized with the dual-mode mobile communication device 910.

Depending upon the type of network or networks 919, the access requirements for the dual-mode mobile communication device 910 may also vary. For example, in the Mobitex and DataTAC data networks, mobile devices are registered on the network using a unique identification number associated with each device. In GPRS data networks, however, network access is associated with a subscriber or user of a mobile device. A GPRS device typically requires a subscriber identity module ("SIM"), which is required in order to operate a dual-mode mobile communication device on a GPRS network. Local or non-network communication functions (if any) may be operable, without the SIM, but a dual-mode mobile communication device will be unable to carry out any functions involving communications over the data network 919, other than any legally required operations, such as 911 emergency calling.

After any required network registration or activation procedures have been completed, the dual-mode mobile communication device 910 may then send and receive communication signals, including both voice and data signals, over the network 919 (or networks). Signals received by the antenna 916 from the communication network 919 are routed to the receiver 912, which provides for signal amplification, frequency down conversion, filtering, channel selection, etc., and may also provide analog to digital conversion. Analog to digital conversion of the received signal allows more complex communication functions, such as digital demodulation and decoding to be performed using the DSP 920. In a similar manner, signals to be transmitted to the network 919 are processed, including modulation and encoding, for example, by the DSP 920 and are then provided to the transmitter 914 for digital to analog conversion, frequency up conversion, filtering, amplification and transmission to the communication network 919 (or networks) via the antenna 918. Although a single transceiver 911 is shown in FIG. 9 for both voice and data communications, it is possible that the dual-mode mobile communication device 910 may include two distinct transceivers, a first transceiver for transmitting and receiving voice signals, and a second transceiver for transmitting and receiving data signals.

In addition to processing the communication signals, the DSP 920 also provides for receiver and transmitter control. For example, the gain levels applied to communication signals in the receiver 912 and transmitter 914 may be adaptively controlled through automatic gain control algorithms implemented in the DSP 920. Other transceiver control algorithms could also be implemented in the DSP 920 in order to provide more sophisticated control of the transceiver 911.

The microprocessor 938 preferably manages and controls the overall operation of the dual-mode mobile communication device 910. Many types of microprocessors or microcontrollers could be used here, or, alternatively, a single DSP 920 could be used to carry out the functions of the microprocessor 938. Low-level communication functions, including at least data and voice communications, are performed through the DSP 920 in the transceiver 911. Other, high-level communication applications, such as a voice communication application 924A, and a data communication application 924B may be stored in the Flash memory 924 for execution by the microprocessor 938. For example, the voice communication module 924A may provide a high-level user interface operable to transmit and receive voice calls between the dual-mode mobile communication device 910 and a plurality of other voice devices via the network 919. Similarly, the data communication module 924B may provide a high-level user interface operable for sending and receiving data, such as e-mail messages, files, organizer information, short text messages, etc., between the dual-mode mobile communication device 910 and a plurality of other data devices via the network 919. In the dual-mode mobile communication device 910, an IP address application, as described above, may also be implemented as a software module or application, or incorporated into one of the software modules 924A–924N.

The microprocessor 938 also interacts with other dual-mode mobile communication device subsystems, such as the display 922, Flash memory 924, random access memory (RAM) 926, auxiliary input/output (I/O) subsystems 928, serial port 930, keyboard 932, speaker 934, microphone 936, a short-range communications subsystem 940 and any other dual-mode mobile communication device subsystems generally designated as 942.

Some of the subsystems shown in FIG. 9 perform communication-related functions, whereas other subsystems may provide resident or on-device functions. Notably, some subsystems, such as keyboard 932 and display 922 may be used for both communication-related functions, such as entering a text message for transmission over a data communication network, and device-resident functions such as a calculator or task list or other PDA type functions.

Operating system software used by the microprocessor 938 is preferably stored in a persistent store such as Flash memory 924. In addition to the operating system, which controls all of the low-level functions of the dual-mode mobile communication device 910, the Flash memory 924 may include a plurality of high-level software application programs, or modules, such as a voice communication module 924A, a data communication module 924B, an organizer module (not shown), or any other type of software module 924N. The Flash memory 924 also may include a file system for storing data. These modules are executed by the microprocessor 938 and provide a high-level interface between a user of the dual-mode mobile communication device and the mobile device. This interface typically includes a graphical component provided through the display 922, and an input/output component provided through the auxiliary I/O 928, keyboard 932, speaker 934, and microphone 936. The operating system, specific dual-mode mobile communication device software applications or modules, or parts thereof, may be temporarily loaded into a volatile store, such as RAM 926 for faster operation. Moreover, received communication signals may also be temporarily stored to RAM 926, before permanently writing them to a file system located in the persistent store 924.

An exemplary application module 924N that may be loaded onto the dual-mode mobile communication device 910 is a personal information manager (PIM) application providing PDA functionality, such as calendar events, appointments, and task items. This module 924N may also interact with the voice communication module 924A for managing phone calls, voice mails, etc., and may also interact with the data communication module for managing e-mail communications and other data transmissions. Alternatively, all of the functionality of the voice communication module 924A and the data communication module 924B may be integrated into the PIM module.

The Flash memory 924 preferably provides a file system to facilitate storage of PIM data items on the dual-mode mobile communication device 910. The PIM application preferably includes the ability to send and receive data items, either by itself, or in conjunction with the voice and data communication modules 924A, 924B, via the wireless network 919. The PIM data items are preferably seamlessly integrated, synchronized and updated, via the wireless network 919, with a corresponding set of data items stored or associated with a host computer system, thereby creating a mirrored system for data items associated with a particular user. The Flash memory 924 also contains an IP address associated with the dual-mode mobile communication device 910, and an IP address mapping table, as described above.

The dual-mode mobile communication device 910 may also be manually synchronized with a host system by placing the dual-mode mobile communication device 910 in an interface cradle, which couples the serial port 930 of the dual-mode mobile communication device 910 to the serial port of the host system. The serial port 930 may also be used to enable a user to set preferences through an external device or software application, or to download other application modules 924N for installation. This wired download path may be used to load an encryption key onto the dual-mode mobile communication device 910, which is a more secure method than exchanging encryption information via the wireless network 919.

Additional application modules 924N may be loaded onto the dual-mode mobile communication device 910 through the network 919, through an auxiliary I/O subsystem 928, through the serial port 930, through the short-range communications subsystem 940, or through any other suitable subsystem 942, and installed by a user in the Flash memory 924 or RAM 926. Such flexibility in application installation increases the functionality of the dual-mode mobile communication device 910 and may provide enhanced on-device functions, communication-related functions, or both. For example, secure communication applications may enable electronic commerce functions and other such financial transactions to be performed using the dual-mode mobile communication device 910.

When the dual-mode device 910 is operating in a data communication mode, a received signal, such as a text message or a web page download, will be processed by the transceiver 911 and provided to the microprocessor 938, which will preferably further process the received signal for output to the display 922, or, alternatively, to an auxiliary I/O device 928. A user of the dual-mode mobile communication device 910 may also compose data items, such as email messages, using the keyboard 932, which is preferably a complete alphanumeric keyboard laid out in the QWERTY style, although other styles of complete alphanumeric keyboards such as the known DVORAK style may also be used. User input to the dual-mode mobile communication device 910 is further enhanced with a plurality of auxiliary I/O devices 928, which may include a thumbwheel input device, a touchpad, a variety of switches, a rocker input switch, etc. The composed data items input by the user may then be transmitted over the communication network 919 via the transceiver 911.

When the dual-mode mobile communication device 910 is operating in a voice communication mode, the overall operation of the dual-mode mobile communication device 910 is substantially similar to the data mode, except that received signals are preferably output to the speaker 934 and voice signals for transmission are generated by a microphone 936. Alternative voice or audio I/O subsystems, such as a voice message recording subsystem, may also be implemented on the dual-mode mobile communication device 910. Although voice or audio signal output is preferably accomplished primarily through the speaker 934, the display 922 may also be used to provide an indication of the identity of a calling party, the duration of a voice call, or other voice call related information. For example, the microprocessor 938, in conjunction with the voice communication module and the operating system software, may detect the caller identification information of an incoming voice call and display it on the display 922.

A short-range communications subsystem 940 is also included in the dual-mode mobile communication device 910. For example, the short-range communications subsystem 940 may include an infrared device and associated circuits and components, or a short-range wireless communication module such as a Bluetooth module or an 802.11 module to provide for communication with similarly-enabled systems and devices. Those skilled in the art will appreciate that "Bluetooth"™ and 802.11 refer to sets of specifications, available from the Institute of Electrical and Electronics Engineers (IEEE), relating to wireless personal area networks and wireless LANs, respectively.

The example used in the above description for the identification information exchanged by mobile stations comprised IP addresses; however, other types of identification information may also be exchanged, including addresses used by networks other than the Internet.

Also, an example of a the mobile station used in this description was a dual-mode communication devices; however, the mobile stations may also be other types of devices, including mobile telephones, PDAs and laptop computers which include wireless communication cards.

The structural arrangements and steps described herein and shown in the drawings are examples of structures, systems, or methods having elements or steps corresponding to the elements or steps of the invention recited in the claims. This written description and drawings may enable those skilled in the art to make and use embodiments having alternative elements or steps that likewise correspond to the elements or steps of the invention recited in the claims. The intended scope of the invention thus includes other structures, systems, or methods that do not differ from the literal language of the claims, and further includes other structures, systems, or methods with insubstantial differences from the literal language of the claims.

We claim:

1. A method of operating comprising the following steps:
   detecting when a first network identification code associated with a first mobile station has changed;
   sending a first message via a wireless network to a first service gateway for forwarding by the first service gateway to a second mobile station wherein the first message comprises the first network identification code;
   receiving from a second service gateway via the wireless network a second message that was sent by the second mobile station wherein the second message comprises a second network identification code that is associated with the second mobile station;
   wherein a message type for the first and second messages is selected from a group comprising an email message, a SMS message and a HTTP message, and wherein the message type for the second message is the same as the message type for the first message;
   storing the second network identification code; and
   requesting a communication link between the first mobile station and the second mobile station via the wireless network using the second network identification code wherein the communication link does not traverse the first or second service gateway.

2. The method of claim 1 wherein the first service gateway is the same physical device as the second service gateway.

3. The method of claim 1 wherein the first service gateway and the second service gateway comprise an email gateway.

4. The method of claim 3 wherein the first message and the second message comprise email messages.

5. The method of claim 1 wherein the first service gateway and the second service gateway comprise a short messaging service center (SMSC).

6. The method of claim 5 wherein the first message and the second message comprise short messaging service (SMS) messages.

7. The method of claim 1 wherein the first service gateway and the second service gateway comprise an internet gateway.

8. The method of claim 7 wherein the internet gateway provides a connection to an IP address service.

9. The method of claim 7 wherein the first message and the second message comprise HTTP packets.

10. The method of claim 9 wherein the first mobile station queries the IP address service to determine the IP address for another mobile station.

11. The method of claim 9 wherein the P address service notifies the first mobile station when the IP address for another mobile station has changed.

12. The method of claim 1 wherein the first service gateway is selected from a group comprising an email gateway, a SMSC, a SMSC with an IP address exchange service, and an Internet gateway with an IP address service.

13. The method of claim 12 wherein the second service gateway is selected from a group comprising an email gateway, a SMSC, a SMSC with an IP address exchange service, and an Internet gateway with an IP address service.

14. The method of claim 13 wherein the second service gateway is the same type of service gateway as the first service gateway.

15. The method of claim 13 wherein the second service gateway is a different type of service gateway than the first service gateway.

16. The method of claim 1 wherein the first mobile station selects as the first service gateway a service gateway from a group comprising an email gateway, a SMSC, a SMSC with an IP address exchange service, and an Internet gateway with an IP address service.

17. The method of claim 16 wherein the first mobile station selects one service gateway type for sending the first identification code to the second mobile station and selects a different service gateway type for sending the first identification code to a third mobile station.

18. The method of claim 16 wherein the first mobile station selects a first service gateway type for sending the first identification code to the second mobile station and selects a different service gateway type for re-sending the first identification code to the second mobile station.

19. The method of claim 1 wherein the first mobile station selects the message type for the first message.

20. The method of claim 19 wherein the first mobile station selects one message type for sending the first identification code to the second mobile station and selects a different message type for sending the first identification code to a third mobile station.

21. The method of claim 19 wherein the first mobile station selects a first message type for sending the first identification code to the second mobile station and selects a different message type for re-sending the first identification code to the second mobile station.

22. The method of claim 1 wherein the first network identification code and the second network identification code comprise IP addresses assigned by the wireless network.

23. The method of claim 22 wherein the first mobile station comprises an IP-monitoring agent for detecting when the IP address of the first mobile station changes.

24. The method of claim 23 wherein the IP-monitoring agent sends the first message after it detects that the IP address of the first mobile station has changed.

25. The method of claim 1 wherein the first message is sent in response to a command by the user of first mobile device to send the first message.

26. The method of claim 1 wherein the first message further comprises status information, location information, or both status and location information.

27. The method of claim 1 wherein the second mobile station is registered as an associate of the first mobile station.

28. The method of claim 27 wherein the registration of the second mobile station is recorded in a mapping table.

29. The method of claim 28 wherein the registration of the second mobile station is recorded in a mapping table that resides in the first mobile station.

30. The method of claim 28 wherein the registration of the second mobile station is recorded in a mapping table that is external to the first mobile station.

31. The method of claim 28 wherein the mapping table comprises email addresses of associates of the first mobile station.

32. The method of claim 28 wherein the mapping table comprises SMS addresses of associates of the first mobile station.

33. The method of claim 1 further comprising the step of sending a response message to the second mobile station in response to receiving the second message.

34. The method of claim 1 wherein the communication link is a peer-to-peer communication link.

35. The method of claim 1 wherein the communication link provides a communication channel for an instant messaging conversation.

36. The method of claim 1 wherein the communication link provides a communication channel for a web server to provide web pages for information exchange.

37. A method of operating comprising the following steps:
detecting when a first network identification code associated with a first mobile station has changed;
sending a first message via a wireless network to a first service gateway for forwarding by the first service gateway to a second mobile station wherein the first message comprises the first network identification code;
receiving from a second service gateway via the wireless network a second message that was sent by the second mobile station wherein the second message comprises a second network identification code that is associated with the second mobile station;
wherein a message type for the first and second messages is selected from a group comprising an email message, a SMS message and a HTTP message, and wherein the message type for the second message is different from the message type for the first message:
storing the second network identification code; and
requesting a communication link between the first mobile station and the second mobile station via the wireless network using the second network identification code wherein the communication link does not traverse the first or second service gateway.

38. The method of claim 37, wherein the first service gateway is the same physical device as the second service gateway.

39. The method of claim 38, wherein the first and second service gateways comprise an email gateway, an SMS gateway or an Internet gateway.

40. The method of claim 37, wherein at least one of the first or second service gateways is an Internet gateway.

41. The method of claim 40, wherein the first network identification code and the second network identification code comprise IP addresses assigned by the wireless network.

42. The method of claim 41, wherein the first mobile station comprises an IP-monitoring agent for detecting when the IP address of the first mobile station changes.

43. The method of claim 37, wherein the first message further comprises status information, location information, or both status and location information.

44. The method of claim 37, wherein the second mobile station is registered as an associate of the first mobile station.

45. The method of claim 44, wherein the registration of the second mobile station is recorded in a mapping table residing either internally or externally to the first mobile station.

46. The method of claim 45, wherein the mapping table comprises email addresses or SMS addresses of associates of the first mobile station.

47. The method of claim 37, wherein the communication link is a peer-to-peer communication link, an instant messaging communication link, or a communication channel for a web server to provide web pages for information exchange.

48. A method of operating comprising the following steps:
detecting when a first network identification code associated with a first mobile station has changed;
sending a first message via a wireless network to a first service gateway for forwarding by the first service gateway to a second mobile station wherein the first message comprises the first network identification code;
wherein the first mobile station selects as the first service gateway a service gateway from a group comprising an email gateway, a SMSC, a SMSC with an IP address exchange service, and an Internet gateway with an IP address service, the first mobile station selecting one service gateway type for sending the first identification code to the second mobile station and selecting a different service gateway type for sending the first identification code to a third mobile station;
receiving from a second service gateway via the wireless network a second message that was sent by the second mobile station wherein the second message comprises a second network identification code that is associated with the second mobile station;
storing the second network identification code; and
requesting a communication link between the first mobile station and the second mobile station via the wireless network using the second network identification code wherein the communication link does not traverse the first or second service gateway.

49. The method of claim 48, wherein a message type for the first and second messages is selected from a group comprising an email message, a SMS message and a HTTP message, and wherein the message type for the second message is the same as the message type for the first message.

50. The method of claim 48, wherein the first service gateway is the same physical device as the second service gateway.

51. The method of claim 48, wherein at least one of the first or second service gateways is an Internet gateway.

52. The method of claim 51, wherein the first network identification code and the second network identification code comprise P addresses assigned by the wireless network.

53. The method of claim 52, wherein the first mobile station comprises an IP-monitoring agent for detecting when the IP address of the first mobile station changes.

54. The method of claim 48, wherein the first message further comprises status information, location information, or both status and location information.

55. The method of claim 48, wherein the second mobile station is registered as an associate of the first mobile station.

56. The method of claim 55, wherein the registration of the second mobile station is recorded in a mapping table residing either internally or externally to the first mobile station.

57. The method of claim 56, wherein the mapping table comprises email addresses or SMS addresses of associates of the first mobile station.

58. The method of claim 48, wherein the communication link is a peer-to-peer communication link, an instant messaging communication link, or a communication channel for a web server to provide web pages for information exchange.

59. A method of operating comprising the following steps:
  detecting when a first network identification code associated with a first mobile station has changed;
  sending a first message via a wireless network to a first service gateway for forwarding by the first service gateway to a second mobile station wherein the first message comprises the first network identification code;
  wherein the first mobile station selects as the first service gateway a service gateway from a group comprising an email gateway, a SMSC, a SMSC with an IP address exchange service, and an Internet gateway with an IP address service, the first mobile station selecting a first service gateway type for sending the first identification code to the second mobile station and selecting a different service gateway type for re-sending the first identification code to the second mobile station;
  receiving from a second service gateway via the wireless network a second message that was sent by the second mobile station wherein the second message comprises a second network identification code that is associated with the second mobile station;
  storing the second network identification code; and
  requesting a communication link between the first mobile station and the second mobile station via the wireless network using the second network identification code wherein the communication link does not traverse the first or second service gateway.

60. The method of claim 59, wherein a message type for the first and second messages is selected from a group comprising an email message, a SMS message and a HTTP message, and wherein the message type for the second message is the same as the message type for the first message.

61. The method of claim 59, wherein the first service gateway is the same physical device as the second service gateway.

62. The method of claim 59, wherein at least one of the first or second service gateways is an Internet gateway.

63. The method of claim 62, wherein the first network identification code and the second network identification code comprise IP addresses assigned by the wireless network.

64. The method of claim 63, wherein the first mobile station comprises an IP-monitoring agent for detecting when the IP address of the first mobile station changes.

65. The method of claim 59, wherein the first message further comprises status information, location information, or both status and location information.

66. The method of claim 59, wherein the second mobile station is registered as an associate of the first mobile station.

67. The method of claim 66, wherein the registration of the second mobile station is recorded in a mapping table residing either internally or externally to the first mobile station.

68. The method of claim 67, wherein the mapping table comprises email addresses or SMS addresses of associates of the first mobile station.

69. The method of claim 59, wherein the communication link is a peer-to-peer communication link, an instant messaging communication link, or a communication channel for a web server to provide web pages for information exchange.

70. A method of operating comprising the following steps:
  detecting when a first network identification code associated with a first mobile station has changed;
  sending a first message via a wireless network to a first service gateway for forwarding by the first service gateway to a second mobile station wherein the first message comprises the first network identification code;
  wherein the first mobile station selects a message type for the first message from a group comprising an email message, a SMS message, and a HTTP message, for sending the first identification code to the second mobile station and selects a different message type for sending the first identification code to a third mobile station;
  receiving from a second service gateway via the wireless network a second message that was sent by the second mobile station wherein the second message comprises a second network identification code that is associated with the second mobile station;
  storing the second network identification code; and
  requesting a communication link between the first mobile station and the second mobile station via the wireless network using the second network identification code wherein the communication link does not traverse the first or second service gateway.

71. The method of claim 70, wherein a message type for the first and second messages is selected from a group comprising an email message, a SMS message and a HTTP message, and wherein the message type for the second message is the same as the message type for the first message.

72. The method of claim 70, wherein the first service gateway is the same physical device as the second service gateway.

73. The method of claim 70, wherein at least one of the first or second service gateways is an Internet gateway.

74. The method of claim 73, wherein the first network identification code and the second network identification code comprise IP addresses assigned by the wireless network.

75. The method of claim 74, wherein the first mobile station comprises an IP-monitoring agent for detecting when the IP address of the first mobile station changes.

76. The method of claim 70, wherein the first message further comprises status information, location information, or both status and location information.

77. The method of claim 70, wherein the second mobile station is registered as an associate of the first mobile station.

78. The method of claim 77, wherein the registration of the second mobile station is recorded in a mapping table residing either internally or externally to the first mobile station.

79. The method of claim 78, wherein the mapping table comprises email addresses or SMS addresses of associates of the first mobile station.

80. The method of claim 70, wherein the communication link is a peer-to-peer communication link, an instant messaging communication link, or a communication channel for a web server to provide web pages for information exchange.

81. A method of operating comprising the following steps:
detecting when a first network identification code associated with a first mobile station has changed;
sending a first message via a wireless network to a first service gateway for forwarding by the first service gateway to a second mobile station wherein the first message comprises the first network identification code;
wherein the first mobile station selects a message type for the first message from a group comprising an email message, a SMS message, and a HTTP message, for sending the first identification code to the second mobile station and selects a different message type for re-sending the first identification code to the second mobile station;
receiving from a second service gateway via the wireless network a second message that was sent by the second mobile station wherein the second message comprises a second network identification code that is associated with the second mobile station;
storing the second network identification code; and
requesting a communication link between the first mobile station and the second mobile station via the wireless network using the second network identification code wherein the communication link does not traverse the first or second service gateway.

82. The method of claim 81, wherein a message type for the first and second messages is selected from a group comprising an email message, a SMS message and a HTTP message, and wherein the message type for the second message is the same as the message type for the first message.

83. The method of claim 81, wherein the first service gateway is the same physical device as the second service gateway.

84. The method of claim 81, wherein at least one of the first or second service gateways is an Internet gateway.

85. The method of claim 84, wherein the first network identification code and the second network identification code comprise IP addresses assigned by the wireless network.

86. The method of claim 85, wherein the first mobile station comprises an IP-monitoring agent for detecting when the IP address of the first mobile station changes.

87. The method of claim 81, wherein the first message further comprises status information, location information, or both status and location information.

88. The method of claim 81, wherein the second mobile station is registered as an associate of the first mobile station.

89. The method of claim 88, wherein the registration of the second mobile station is recorded in a mapping table residing either internally or externally to the first mobile station.

90. The method of claim 89, wherein the mapping table comprises email addresses or SMS addresses of associates of the first mobile station.

91. The method of claim 81, wherein the communication link is a peer-to-peer communication link, an instant messaging communication link, or a communication channel for a web server to provide web pages for information exchange.

92. A method of operating comprising the following steps:
detecting when a first network identification code associated with a first mobile device has changed;
sending a first message via a wireless network to a first service gateway for forwarding by the first service gateway to a second mobile station wherein the first message comprises the first network identification code;
wherein the second mobile station is registered as an associate of the first mobile station, and wherein the registration of the second mobile station is recorded in a mapping table that resides in the first mobile station;
receiving from a second service gateway via the wireless network a second message that was sent by the second mobile station wherein the second message comprises a second network identification code that is associated with the second mobile station;
storing the second network identification code; and
requesting a communication link between the first mobile station and the second mobile station via the wireless network using the second network identification code wherein the communication link does not traverse the first or second service gateway.

93. The method of claim 92, wherein a message type for the first and second messages is selected from a group comprising an email message, a SMS message and a HTTP message, and wherein the message type for the second message is the same as the message type for the first message.

94. The method of claim 92, wherein the first service gateway is the same physical device as the second service gateway.

95. The method of claim 92, wherein at least one of the first or second service gateways is an Internet gateway.

96. The method of claim 95, wherein the first network identification code and the second network identification code comprise IP addresses assigned by the wireless network.

97. The method of claim 95, wherein the first mobile station comprises an IP-monitoring agent for detecting when the IP address of the first mobile station changes.

98. The method of claim 92, wherein the first message further comprises status information, location information, or both status and location information.

99. The method of claim 92, wherein the communication link is a peer-to-peer communication link, an instant messaging communication link, or a communication channel for a web server to provide web pages for information exchange.

100. A method of operating comprising the following steps:
detecting when a first network identification code associated with a first mobile device has changed;
sending a first message via a wireless network to a first service gateway for forwarding by the first service gateway to a second mobile station wherein the first message comprises the first network identification code;
wherein the second mobile station is registered as an associate of the first mobile station, and wherein the registration of the second mobile station is recorded in a mapping table that is external to the first mobile station;

receiving from a second service gateway via the wireless network a second message that was sent by the second mobile station wherein the second message comprises a second network identification code that is associated with the second mobile station;

storing the second network identification code; and requesting a communication link between the first mobile station and the second mobile station via the wireless network using the second network identification code wherein the communication link does not traverse the first or second service gateway.

101. The method of claim 100, wherein a message type for the first and second messages is selected from a group comprising an email message, a SMS message and a HTTP message, and wherein the message type for the second message is the same as the message type for the first message.

102. The method of claim 100, wherein the first service gateway is the same physical device as the second service gateway.

103. The method of claim 100, wherein at least one of the first or second service gateways is an Internet gateway.

104. The method of claim 103, wherein the first network identification code and the second network identification code comprise IP addresses assigned by the wireless network.

105. The method of claim 103, wherein the first mobile station comprises an IP-monitoring agent for detecting when the IP address of the first mobile station changes.

106. The method of claim 100, wherein the first message further comprises status information, location information, or both status and location information.

107. The method of claim 100, wherein the communication link is a peer-to-peer communication link, an instant messaging communication link, or a communication channel for a web server to provide web pages for information exchange.

108. A method of operating comprising the following steps:

detecting when a first network identification code associated with a first mobile device has changed;

sending a first message via a wireless network to a first service gateway for forwarding by the first service gateway to a second mobile station wherein the first message comprises the first network identification code;

wherein the second mobile station is registered as an associate of the first mobile station, and wherein the registration of the second mobile station is recorded in a mapping table comprising email addresses or SMS addresses of associates of the first mobile station;

receiving from a second service gateway via the wireless network a second message that was sent by the second mobile station wherein the second message comprises a second network identification code that is associated with the second mobile station;

storing the second network identification code; and requesting a communication link between the first mobile station and the second mobile station via the wireless network using the second network identification code wherein the communication link does not traverse the first or second service gateway.

109. The method of claim 108, wherein a message type for the first and second messages is selected from a group comprising an email message, a SMS message and a HTTP message, and wherein the message type for the second message is the same as the message type for the first message.

110. The method of claim 108, wherein the first service gateway is the same physical device as the second service gateway.

111. The method of claim 108, wherein at least one of the first or second service gateways is an Internet gateway.

112. The method of claim 111, wherein the first network identification code and the second network identification code comprise IP addresses assigned by the wireless network.

113. The method of claim 111, wherein the first mobile station comprises an IP-monitoring agent for detecting when the IP address of the first mobile station changes.

114. The method of claim 108, wherein the first message further comprises status information, location information, or both status and location information.

115. The method of claim 108, wherein the communication link is a peer-to-peer communication link, an instant messaging communication link, or a communication channel for a web server to provide web pages for information exchange.

* * * * *

UNITED STATES PATENT AND TRADEMARK OFFICE
CERTIFICATE OF CORRECTION

PATENT NO.         : 7,103,333 B2
APPLICATION NO. : 10/698603
DATED              : September 5, 2006
INVENTOR(S)        : Lazaridis et al.

It is certified that error appears in the above-identified patent and that said Letters Patent is hereby corrected as shown below:

Column 18, line 64, please replace "comprise P" with -- comprise IP --

Signed and Sealed this

Twenty-third Day of October, 2007

JON W. DUDAS
*Director of the United States Patent and Trademark Office*